US011312915B2

United States Patent
Galante-Fox et al.

(10) Patent No.: US 11,312,915 B2
(45) Date of Patent: Apr. 26, 2022

(54) METHODS TO REDUCE FREQUENCY OF DIESEL PARTICULATE FILTER REGENERATION

(71) Applicant: Afton Chemical Corporation, Richmond, VA (US)

(72) Inventors: Julienne Galante-Fox, Midlothian, VA (US); Brian Sears, Richmond, VA (US); Timothy J. Whalen, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 16/930,815

(22) Filed: Jul. 16, 2020

(65) Prior Publication Data

US 2021/0017464 A1 Jan. 21, 2021

Related U.S. Application Data

(60) Provisional application No. 62/876,115, filed on Jul. 19, 2019.

(51) Int. Cl.
*C10L 1/232* (2006.01)
*C10L 1/222* (2006.01)
(Continued)

(52) U.S. Cl.
CPC ............. *C10L 1/232* (2013.01); *C10L 1/228* (2013.01); *C10L 1/2222* (2013.01); *C10L 10/06* (2013.01); *F01N 3/021* (2013.01); *C10L 2200/0446* (2013.01); *C10L 2230/22* (2013.01); *F01N 2430/04* (2013.01)

(58) Field of Classification Search
CPC ........ C10L 1/232; C10L 1/2222; C10L 10/06; C10L 1/228; C10L 2230/22; C10L 2200/0446; C10L 2270/026; C10L 1/2283; C10L 1/2425; C10L 1/2227; C10L 1/2383; C10L 1/224; C10L 1/143; F01N 3/021; F01N 2430/04; F01N 9/002; Y02T 10/40

See application file for complete search history.

(56) References Cited

U.S. PATENT DOCUMENTS 3,015,668 A 1/1962 Kozikowski
4,152,499 A 5/1979 Boerzel et al.
(Continued)

FOREIGN PATENT DOCUMENTS

DE 19748561 A1 * 5/1999 ............. F01N 3/032
FR 2886648 A1 * 12/2006 ............. C10L 10/08

OTHER PUBLICATIONS

Regeneration of Diesel Particulate Filters Effect of Renewable Fuels Jose Ridriguez-Fernandez, Magin Laperta Jesus Sanches Valdepenas Renewable Energy 104 (2017) 30-30 (Year: 2017).*

*Primary Examiner* — Pamela H Weiss
(74) *Attorney, Agent, or Firm* — Honigman LLP

(57) ABSTRACT

The present disclosure relates to a method of reducing regeneration frequency of a diesel particulate filter in a vehicle combusting diesel fuel. The method includes combusting a diesel fuel in a vehicle engine having a diesel particulate filter and wherein the diesel particulate filter requires regeneration thereof. The diesel fuel has less than about 50 ppmw of sulfur and one or more select additives to reduce a measured frequency of regeneration of the diesel particulate filter.

14 Claims, 1 Drawing Sheet

(51) Int. Cl.
    *C10L 10/06*     (2006.01)
    *C10L 1/228*     (2006.01)
    *F01N 3/021*     (2006.01)

(56) References Cited

U.S. PATENT DOCUMENTS

| | | | |
|---|---|---|---|
| 4,234,435 A | 11/1980 | Meinhardt et al. | |
| 4,482,357 A | 11/1984 | Hanlon | |
| 5,266,223 A | 11/1993 | Song et al. | |
| 5,575,823 A | 11/1996 | Wallace et al. | |
| 6,056,792 A * | 5/2000 | Barr | F01N 3/0212 44/403 |
| 7,980,067 B2 * | 7/2011 | Barton | F01N 9/002 60/295 |
| 8,529,643 B2 | 9/2013 | Galante-Fox et al. | |
| 8,758,456 B2 | 6/2014 | Fang et al. | |
| 8,852,297 B2 | 10/2014 | Fang et al. | |
| 2003/0182848 A1 * | 10/2003 | Collier | C10L 1/1888 44/358 |
| 2006/0080954 A1 * | 4/2006 | Bardasz | C10M 159/20 60/295 |
| 2010/0011748 A1 * | 1/2010 | Yokota | F01N 11/00 60/286 |
| 2010/0043408 A1 * | 2/2010 | Girot | F02D 41/2451 60/287 |
| 2013/0333650 A1 * | 12/2013 | Fang | C10L 1/2383 123/1 A |

* cited by examiner

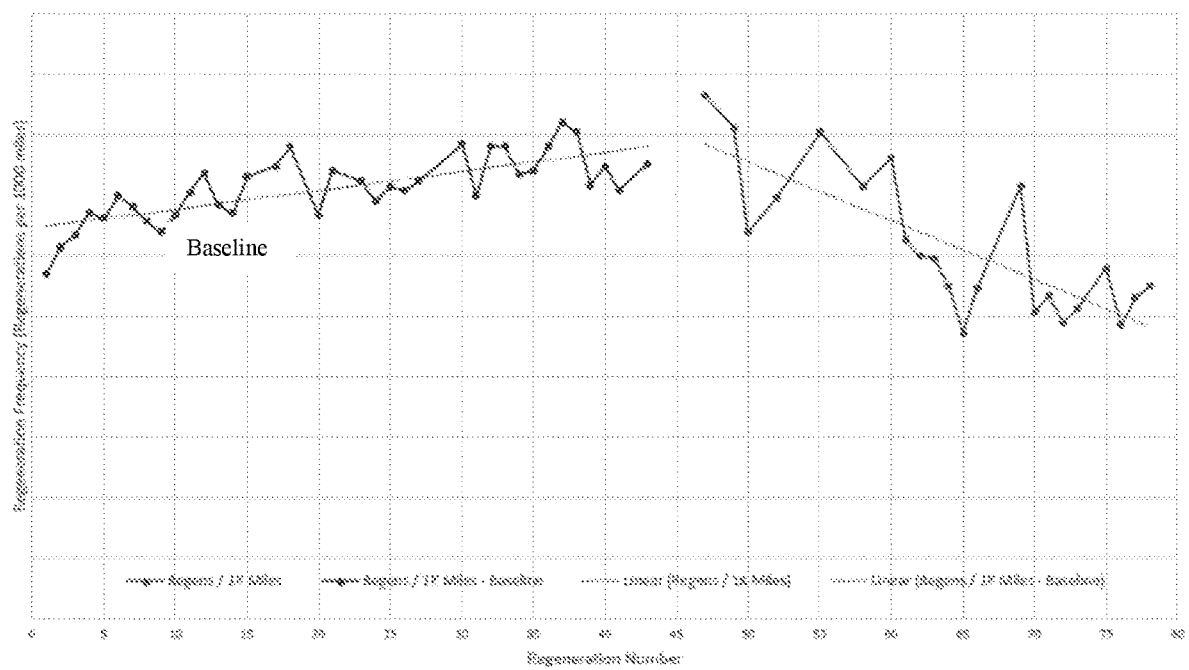

METHODS TO REDUCE FREQUENCY OF DIESEL PARTICULATE FILTER REGENERATION

CROSS REFERENCE TO RELATED APPLICATION

This application claims the benefit of provisional U.S. Application No. 62/876,115 filed Jul. 19, 2019.

TECHNICAL FIELD

The present disclosure relates to methods for reducing regeneration frequency of a diesel particulate filter in a vehicle combusting diesel fuel, and more particularly, to the use of one or more diesel performance additives to reduce measured regeneration frequency and improve fuel economy.

BACKGROUND

Diesel engines commonly result in combustion contaminates and particulates that tend to be undesired for a variety of reasons. The contaminates and particulates are often due to the incomplete combustion that tends to be inherent in the diesel engine and often results in small soot particles. A diesel particulate filter or DPF is a filtration device employed on modern vehicles combusting diesel fuel to remove the particulate and soot from the exhaust gas stream of the diesel engine.

During normal use, the DPF accumulates soot and particulate on or in the filter media. The filter can either be replaced or, more commonly, regenerated to burn off the accumulated soot. Regeneration is often achieved by increasing exhaust gas temperatures either through passive or active means in conjunction with injecting excess fuel into the cylinders. Such extra injections of fuel can lead to reductions in fuel economy.

BRIEF DESCRIPTION OF THE FIGURES

FIG. 1 is a graph of regeneration frequency comparing the frequency of regeneration of a baseline or unadditized fuel to an additized diesel fuel.

SUMMARY

In some aspects or embodiments of the present disclosure, a method of reducing measured regeneration frequency of a diesel particulate filter in a vehicle combusting diesel fuel is provided. In one approach, the method comprises (a) combusting a diesel fuel in a vehicle engine, wherein the vehicle includes a diesel particulate filter associated with the engine and wherein the diesel particulate filter requires regeneration thereof. The diesel fuel has less than about 50 ppmw of sulfur and one or more additives selected from (i) a hydrocarbyl substituted dicarboxylic anhydride derivative prepared by reacting a hydrocarbyl-substituted succinic acylating agent with an amine, polyamine, or alkyl amine having one or more primary, secondary, or tertiary amino groups; (ii) a quaternary ammonium internal salt obtained from amines or polyamines that is substantially devoid of any free anion species; or (iii) a reaction product of a hydrocarbyl carbonyl compound and an amine compound selected from the group consisting of guanidine, urea, thiourea, and combinations thereof; (b) regenerating the diesel particulate filter while combusting the diesel fuel; and (c) comparing the frequency of regeneration of the diesel particulate filter when combusting the diesel fuel comprising the one or more additives with the frequency of regeneration of the diesel particulate filter when combusting a diesel fuel which is devoid of the one or more additives; wherein the frequency of regenerations per 1000 miles of the diesel particulate filter when combusting the diesel fuel comprising the one or more additives is lower than a frequency of regenerations per 1000 miles of the diesel particulate filter when combusting a diesel fuel in the engine devoid of the one or more additives.

In other aspects or embodiments, the method of the previous paragraph may be combined with one or more optional features or method steps in any combination or sub-combination thereof. These other embodiments or sub-embodiments include one or more of the following: wherein the hydrocarbyl substituted dicarboxylic anhydride derivative of additive (i) has a structure of Formula II

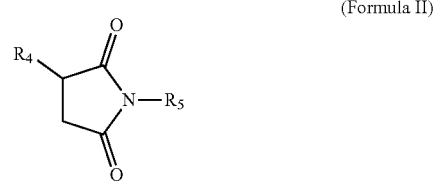

(Formula II)

wherein $R_4$ is a hydrocarbyl group and $R_5$ is hydrogen, an alkyl group, an aryl group, —OH, —$NHR_{5'}$, or a polyamine and wherein R5' is a hydrogen or an alkyl group; and/or wherein the additive of Formula II includes a hydrocarbyl substituted succinimide derived from ethylene diamine, diethyelene triamine, triethylene tetraamine, tetraethylene pentamine, pentaethylene hexamine, N,N'-(iminodi-2,1,ethanediyl)bis-1,3-propanediamine and combinations thereof; and/or wherein $R_4$ in the compound of Formula II is a hydrocarbyl group having a number average molecular weight from about 450 to about 3,000 and $R_5$ is derived from tetraethylene pentamine and derivatives thereof; and/or wherein the additive (ii) of the diesel fuel has the structure of Formula VI

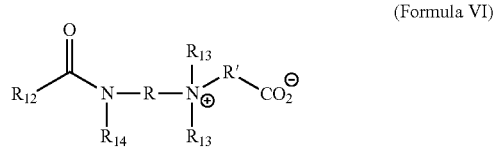

(Formula VI)

wherein R and R' are independently alkylene linkers having 1 to 10 carbon atoms; $R_{12}$ is a hydrocarbyl group or optionally substituted hydrocarbyl group, or an aryl group or optionally substituted aryl group; $R_{13}$ is independently a linear or branched C1 to C4 alkyl group; and $R_{14}$ is hydrogen or a C1 to C4 alkyl group; and/or wherein R and R' are independently alkylene linkers having 1 to 3 carbon atoms and $R_{12}$ is a C8 to C20 hydrocarbyl group; and/or wherein R' includes a methylene linker; and/or wherein $R_{13}$ is a methyl group; and/or wherein $R_{12}$ is derived from an oleyl fatty acid; and/or wherein additive (iii) of the diesel fuel is the reaction product of a hydrocarbyl substituted succinic anhydride, hydrocarbyl substituted succinic acid, or esters of hydrocarbyl substituted succinic acids with an amine selected from guanidine, urea, or thiourea of the Formula VIII, or salts thereof:

(Formula VIII)

where X is $NR_{17}$, O or S, wherein $R_{17}$ is H or $C_1$ to $C_{15}$ hydrocarbyl; and $R_{16}$ is H, $-NR_{18}R_{19}$ or $C_1$ to $C_{20}$ hydrocarbyl or hydroxyl-substituted hydrocarbyl, wherein $R_{18}$ and $R_{19}$ can be the same or different and are H or $C_1$ to $C_{20}$ hydrocarbyl or hydroxyl-substituted hydrocarbyl; and/or wherein the amine is an inorganic salt of guanidine; and/or wherein the amine is a salt of aminoguanidine; and/or wherein the amine is aminoguanidine bicarbonate; and/or wherein the diesel fuel includes about 5 ppmw to about 150 ppmw of additive (i) and about 1 ppmw to about 35 ppmw of additive (ii); and/or wherein the diesel fuel includes about 10 ppmw to about 150 ppmw of the additive (i) and about 5 ppmw to about 50 ppmw of additive (iii); and/or wherein the diesel fuel includes less than about 20 weight percent of bio-generated diesel fuel additives selected from the group consisting of fatty acid methyl esters, hydrotreated vegetable oil, soybean methyl esters, palm methyl esters, and combinations thereof; and/or wherein the regeneration occurs when the engine injects excess diesel fuel into a cylinder to increase the exhaust gas temperature to exceed a predetermined temperature and reacts with a catalyst (DOC) causing an elevated temperature across the catalyst and into the diesel particulate filter; and/or wherein the elevated temperature oxidizes soot trapped in or on the diesel particulate filter and regenerates or cleans the filter; and/or wherein the regeneration is measured when the exhaust gas stream exceeds about 480° C.; and/or wherein the reduction in regeneration frequency occurs immediately upon combusting the diesel fuel having the one or more additives; and/or wherein the regeneration frequency per 1000 miles is about 0.5 to about 20 percent lower than the regeneration frequency per 1000 miles of a diesel fuel without the one or more additives; and/or wherein diesel fuel further include additives selected from thiazole, triazole, thiadiazole, and combinations thereof and/or wherein the thiazole, triazole, thiadiazole are selected from benzotriazole, tolyltriazole, octyltriazole, decyltriazole, dodecyltriazole, 2-mercapto benzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-bis(hydrocarbyldithio)-1,3,4-thiadiazoles, and combinations thereof.

DETAILED DESCRIPTION

The present disclosure relates to methods of combusting a diesel fuel and measuring a regeneration frequency of a diesel particulate filter (DPF) in a vehicle combusting diesel fuel to provide a reduction in measured DPF regeneration frequency. As explained in the background, most diesel engines employ the DPF to remove soot and other combustion particulates from the exhaust gas. These filters are associated with diesel engines and commonly located downstream of the engine in the exhaust systems. They may be found after a turbocharger or positioned before or after a catalytic converter in the exhaust system. These filters need regeneration from time to time and commonly employ one or more regeneration techniques to renew the filter. Regeneration of the DPF occurs when the exhaust temperature is high enough to react with or activate a diesel oxidation catalyst (DOC) to burn off the accumulated soot and particulate on the filter upon injecting excess diesel fuel into the engine. Regeneration commonly involves either an active regeneration cycle or a passive regeneration cycle. An active regeneration occurs when the exhaust gas and catalyst temperature is not high enough to light off the DOC. In this instance, the vehicle ECU adjusts engine parameters (such as, but not limited to, injection timing, turbo geometry, etc.) to increase exhaust temperature while also injecting the excess fuel into the cylinder to cause an exothermic reaction which then oxidizes the soot in the DPF and cleans or "regenerates" the filter. Likewise, a passive regeneration is when the engine exhaust temperature is already high enough to facilitate the reaction of excess fuel in the DOC and the ECU only needs to inject excess fuel for the regeneration to occur. This later situation usually happens at high RPM or high load conditions.

The regeneration cycles tend to substantially increase fuel consumption, and thus, decrease fuel economy of the vehicle. Discovered herein, on the other hand, are methods of combusting diesel fuel and regenerating the DPF by reducing the frequency of measured regenerations and, thus, the overall fuel consumption of the diesel engine at the same time.

In one aspect, the methods herein include combusting a diesel fuel in a vehicle engine, wherein the vehicle includes a diesel particulate filter associated with the engine and the frequency of measured regeneration is decreased by combusting a diesel fuel having a select combination of additives that surprisingly decrease the measured regeneration frequency. In one approach, the method includes combusting diesel fuel having less than about 50 ppmw of sulfur (that is, low sulfur diesel fuel or, in other approaches, ultra-low sulfur diesel fuel having less than 15 ppmw of sulfur) and one or more additives selected from (i) a hydrocarbyl substituted dicarboxylic anhydride derivative prepared by reacting a hydrocarbyl-substituted succinic acylating agent with an amine, polyamine, or alkyl amine having one or more primary, secondary, or tertiary amino groups; (ii) a quaternary ammonium internal salt obtained from amines or polyamines that is substantially devoid of any free anion species; or (iii) a reaction product of a hydrocarbyl carbonyl compound and an amine compound selected from the group consisting of guanidine, urea, thiourea, and combinations thereof. In other approaches, the methods include combusting the low sulfur diesel fuel with combinations of additives (i) and (ii); (i) and (iii), (ii) and (iii), or (i), (ii), and (iii) or other combinations thereof. The methods may further include regenerating the diesel particulate filter, typically using an active regeneration, a passive regeneration, other suitable regeneration cycle, while combusting the diesel fuel (which may also include an excess fuel injection) and measuring a frequency of regenerations of the diesel particular filter. When combusting the diesel fuel and the select additive compositions herein, the measured frequency of regenerations per 1000 miles is lower than the measured frequency of regenerations per 1000 miles of the diesel particular filter when combusting a diesel fuel in the engine without or devoid of the one or more additives. As used herein, an excess fuel injection generally means additional diesel fuel beyond the stoichiometric amount required for combustion to normally operate the diesel engine. As used herein, without or devoid of generally mean no active amounts, such as less than about 5 ppm of active additives, less than about 1 ppm, and preferably no active DPF additives. The excess fuel is vaporized and mixed with the exhaust gases.

In some approaches or embodiments, the combination of total active DPF regeneration reduction additives present in the diesel fuel may range from about 10 ppmw to about 150 ppmw. In other embodiments, the combination of total active DPF regeneration reduction additives may be present in the diesel fuel at least about 10 ppmw, at least about 20 ppmw, at least about 40 ppmw, at least about 50 ppmw, at least about 60 ppmw, at least about 80 ppmw, or at least about 100 ppmw and less than about 150 ppm, less than about 140 ppmw, less than about 130 ppmw, less than about 120 ppmw, less than about 110 ppmw, less than about 100 ppmw, less than about 90 ppmw, less than about 80 ppmw, or less than about 70 ppmw where ppmw is parts per million by weight.

In other approaches or embodiments, the diesel fuel may include about 5 ppmw to about 150 ppmw of additive (i) and about 5 ppmw to about 50 ppmw of additive (ii) at the same time. In yet other approaches or other embodiments, the diesel fuel includes about 35 ppmw to about 150 ppmw of the additive (i) and about 5 ppmw to about 50 ppmw of additive (iii) at the same time. In additional embodiments, the diesel fuel may include about 5 ppmw to about 100 ppmw of additive (i) and about 1 ppmw to about 35 ppmw of additive (ii). In still other embodiments, the diesel fuel includes about 35 ppmw to about 150 ppmw of the additive (i) and about 5 ppmw to about 50 ppmw of additive (iii). Other ranges and combinations of additives within the noted endpoints may also be contemplated by this disclosure. As used throughout this disclosure and unless stated otherwise, the amount of the DPF additives are noted in active amounts and does not include amounts of solvents or other carriers.

In some embodiments, the one or more additives selected may include the hydrocarbyl substituted dicarboxylic anhydride derivative alone, the quaternary ammonium internal salt alone; or the reaction product of the hydrocarbyl carbonyl compound and the amine compound alone. In other embodiments, the one or more additives selected may comprise a combination of all three additives including the hydrocarbyl substituted dicarboxylic anhydride derivative, the quaternary ammonium internal salt, and the reaction product of the hydrocarbyl carbonyl compound and the amine compound. In still other embodiments, the one or more additives selected may include a combination of two additives including the hydrocarbyl substituted dicarboxylic anhydride derivative and the quaternary ammonium internal salt, the hydrocarbyl substituted dicarboxylic anhydride derivative and the reaction product of the hydrocarbyl carbonyl compound and the amine compound, or the quaternary ammonium internal salt and the reaction product of the hydrocarbyl carbonyl compound and the amine compound. Each of these three additives suitable for the methods herein are described in more detail below.

Hydrocarbyl Substituted Dicarboxylic Anhydride Derivative

One of the discovered additives to reduce measured DPF regeneration frequency when combusting diesel fuel is a hydrocarbyl substituted dicarboxylic anhydride derivative. In one approach, this additive may be prepared by reacting a hydrocarbyl-substituted succinic acylating agent with an amine, polyamine, or alkyl amine having one or more primary, secondary, or tertiary amino groups. In some embodiments, the hydrocarbyl substituted dicarboxylic anhydride derivative includes hydrocarbyl succinimides, succinamides, succinimide-amides and succinimide-esters.

These nitrogen-containing derivatives of hydrocarbyl succinic acylating agents may be prepared by reacting a hydrocarbyl-substituted succinic acylating agent with an amine, polyamine, or alkyl amine having one or more primary, secondary, or tertiary amino groups.

In some approaches or embodiments, the hydrocarbyl substituted dicarboxylic anhydride derivative may include a hydrocarbyl substituent having a number average molecular weight ranging from about 450 to about 3000 as measured by GPC using polystyrene as reference. The derivative may be selected from a diamide, acid/amide, acid/ester, diacid, amide/ester, diester, and imide. Such derivative may be made from reacting a hydrocarbyl substituted dicarboxylic anhydride with ammonia, a polyamine, or an alkyl amine having one or more primary, secondary, or tertiary amino groups. In some embodiments, the polyamine or alkyl amine may be tetraethylene pentamine (TEPA), triethylenetetramine (TETA), and the like amines. In other approaches, the polyamine or alkyl amine may have the formula $H_2N$—$((CHR_1(CH_2)_q$—$NH)_r$—H, wherein $R_1$ is hydrogen or an alkyl group having from 1 to 4 carbon atoms, q is an integer of from 1 to 4 and r is an integer of from 1 to 6, and mixtures thereof. In other approaches, a molar ratio of the hydrocarbyl substituted dicarboxylic anhydride reacted with the ammonia, polyamine, or alkyl amine may be from about 0.5:1 to about 2:1, in other approaches about 1:1 to about 2:1.

In other approaches, the hydrocarbyl substituted dicarboxylic anhydride may be a hydrocarbyl carbonyl compound of the Formula I:

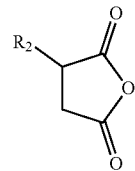

(Formula I)

where $R_2$ is a hydrocarbyl group derived from a polyolefin. In some aspects, the hydrocarbyl carbonyl compound may be a polyalkylene succinic anhydride reactant wherein $R_2$ is a hydrocarbyl moiety, such as for example, a polyalkenyl radical having a number average molecular weight of from about 450 to about 3000 as measured by GPC using polystyrene as reference. For example, the number average molecular weight of $R_2$ may range from about 600 to about 2500, or from about 700 to about 1500, as measured by GPC using polystyrene as reference. A particularly useful $R_2$ has a number average molecular weight of about 950 to about 1000 Daltons (as measured by GPC using polystyrene as reference) and comprises polyisobutylene. Unless indicated otherwise, molecular weights in the present specification are number average molecular weights as measured by GPC using polystyrene as reference.

The $R_2$ hydrocarbyl moiety may include one or more polymer units chosen from linear or branched alkenyl units. In some aspects, the alkenyl units may have from about 2 to about 10 carbon atoms. For example, the polyalkenyl radical may comprise one or more linear or branched polymer units chosen from ethylene radicals, propylene radicals, butylene radicals, pentene radicals, hexene radicals, octene radicals and decene radicals. In some aspects, the $R_2$ polyalkenyl radical may be in the form of, for example, a homopolymer, copolymer or terpolymer. In one aspect, the polyalkenyl radical is isobutylene. For example, the polyalkenyl radical may be a homopolymer of polyisobutylene comprising from about 10 to about 60 isobutylene groups, such as from about 20 to about 30 isobutylene groups. The polyalkenyl compounds used to form the $R_2$ polyalkenyl radicals may be formed by any suitable methods, such as by conventional catalytic oligomerization of alkenes.

In some aspects, high reactivity polyisobutenes having relatively high proportions of polymer molecules with a terminal vinylidene group may be used to form the $R_2$ group. In one example, at least about 60%, such as about 70% to about 90%, of the polyisobutenes comprise terminal olefinic double bonds. High reactivity polyisobutenes are disclosed, for example, in U.S. Pat. No. 4,152,499, the disclosure of which is herein incorporated by reference in its entirety.

In some aspects, approximately one mole of maleic anhydride may be reacted per mole of polyalkylene, such that the resulting polyalkenyl succinic anhydride has about 0.8 to about 1 succinic anhydride group per polyalkylene substituent. In other aspects, the molar ratio of succinic anhydride groups to polyalkylene groups may range from about 0.5 to about 3.5, such as from about 1 to about 1.1.

The hydrocarbyl carbonyl compounds may be made using any suitable method. One example of a method for forming a hydrocarbyl carbonyl compound comprises blending a polyolefin and maleic anhydride. The polyolefin and maleic anhydride reactants are heated to temperatures of, for example, about 150° C. to about 250° C., optionally, with the use of a catalyst, such as chlorine or peroxide. Another exemplary method of making the polyalkylene succinic anhydrides is described in U.S. Pat. No. 4,234,435, which is incorporated herein by reference in its entirety.

In the hydrocarbyl substituted dicarboxylic anhydride derivative, the polyamine reactant may be an alkylene polyamine. For example, the polyamine may be selected from ethylene polyamine, propylene polyamine, butylenes polyamines, and the like. In one approach, the polyamine is an ethylene polyamine that may be selected from ethylene diamine, diethylene triamine, triethylene tetramine, tetraethylene pentamine, pentaethylene hexamine, and N, N'-(iminodi-2,1,ethanediyl) bis-1,3-propanediamine. A particularly useful ethylene polyamine is a compound of the formula $H_2N-((CHR_1-(CH_2)_q-NH)_r-H$, wherein $R_1$ is hydrogen, q is 1 and r is 4.

In yet further approaches, the hydrocarbyl substituted dicarboxylic anhydride derivative is a compound of Formula II

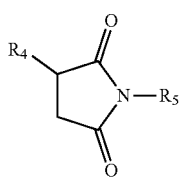

(Formula II)

wherein $R_4$ is a hydrocarbyl group (such as polyisobutylene and/or the other above described $R_2$ moieties) and $R_5$ is a hydrogen, an alkyl group, an aryl group, —OH, —$NHR_6$, or a polyamine, or an alkyl group containing one or more primary, secondary, or tertiary amino groups. In some approaches, $R_5$ is derived from ethylene diamine, diethylene triamine, triethylene tetraamine, tetraethylene pentamine, pentaethylene hexamine, N,N'-(iminodi-2,1,ethanediyl) bis-1,3-propanediamine and combinations thereof. In some embodiments, $R_4$ is a hydrocarbyl group and $R_5$ is hydrogen, an alkyl group, an aryl group, —OH, —$NHR_{5'}$, or a polyamine and wherein R5' is a hydrogen or an alkyl group. In other embodiments, the additive of Formula II includes a hydrocarbyl substituted succinimide derived from ethylene diamine, diethylene triamine, triethylene tetraamine, tetraethylene pentamine, pentaethylene hexamine, N,N'-(iminodi-2,1,ethanediyl)bis-1,3-propanediamine and combinations thereof. In still other embodiments, $R_4$ in the compound of Formula I is a hydrocarbyl group having a number average molecular weight from about 450 to about 3,000 and $R_5$ is derived from tetraethylene pentamine and derivatives thereof.

In yet other approaches $R_5$ is a compound of Formula III:

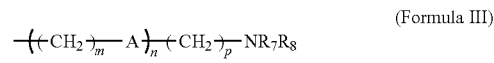

(Formula III)

wherein A is $NR_6$ or an oxygen atom, $R_6$, $R_7$, and $R_8$ are independently a hydrogen atom or an alkyl group, m and p are integers from 2 to 8; and n is an integer from 0 to 4. In some approaches, $R_7$ and $R_8$ of Formula III, together with the nitrogen atom to which they are attached, form a 5 membered ring.

In yet other approaches, the diesel fuel herein includes about 5 to about 150 ppmw of the active hydrocarbyl substituted dicarboxylic anhydride derivative (i), in other approaches, about 5 to about 100 ppmw, or about 30 to about 150 ppmw, or about 30 to about 120 ppmw, or about 5 to about 90 ppmw, and in yet other approaches, 5 to 50 ppmw. In yet other approaches, the diesel fuel herein includes an amount of this additive ranging from at least about 5 ppmw, at least about 10 ppmw, at least about 20 ppmw, at least about 30 ppmw, or at least about 40 to less than about 150 ppmw, less than about 120 ppmw, less than about 100 ppmw, less than about 90 ppmw, less than about 80 ppmw, less than about 70 ppmw, less than about 50 ppm, less than about 40 ppm, or less than about 30 ppmw. In some approaches, when then PIBSA to amine ratio is about 0.5:1 to about 1.2:1, then the diesel fuel includes about 35 to about 150 ppmw of this additive. In other approaches, when the PIBSA to amine ratio is about 1.4:1 to about 2.0:1, then the diesel fuel includes about 5 to about 100 ppmw of the additive.

A diesel fuel additive or concentrate including this compound may have about 10 to about 80 weight percent of active Quaternary Ammonium Internal Salt Another possible additive in the blend to reduce measured DPF regeneration frequency when combusting diesel fuel is a quaternary ammonium internal salt. In some embodiments, the quaternary ammonium internal salt may be obtained from amines or polyamines that are substantially devoid of any free anion species. For example, such additive may be made by reacting a tertiary amine of Formula IV:

(Formula IV)

wherein each of $R_9$, $R_{10}$, and $R_{11}$ is selected from hydrocarbyl groups containing from 1 to 200 carbon atoms, with a halogen substituted C2-C8 carboxylic acid, ester, amide, or salt thereof. What is generally to be avoided in the reaction is quaternizing agents selected from the group consisting of hydrocarbyl substituted carboxylates, carbonates, cyclic-carbonates, phenates, epoxides, or mixtures thereof. In one embodiment, the halogen substituted C2-C8 carboxylic acid, ester, amide, or salt thereof may be selected from chloro-, bromo-, fluoro-, and iodo-C2-C8 carboxylic acids, esters, amides, and salts thereof. The salts may be alkali or alkaline earth metal salts selected from sodium, potassium, lithium calcium, and magnesium salts. A particularly useful halogen substituted compound for use in the reaction is the sodium or potassium salt of a chloroacetic acid.

As used herein the term "substantially devoid of free anion species" means that the anions, for the most part are covalently bound to the product such that the reaction product as made does not contain any substantial amounts of free anions or anions that are ionically bound to the product. In one embodiment, "substantially devoid" means from 0 to less than about 2 wt. % of free anion species or any range therein.

In another approach or embodiment, a tertiary amine including monoamines and polyamines may be reacted with the halogen substituted acetic acid or derivative thereof to provide the first detergent additive of the synergistic mixture. Suitable tertiary amine compounds are those of Formula V:

(Formula V)

where each of $R_9$, $R_{10}$, and $R_{11}$ is selected, as noted above, from hydrocarbyl groups containing from 1 to 200 carbon atoms. Each hydrocarbyl group $R_9$ to $R_{11}$ may independently be linear, branched, substituted, cyclic, saturated, unsaturated, or contain one or more hetero atoms. Suitable hydrocarbyl groups may include, but are not limited to alkyl groups, aryl groups, alkylaryl groups, arylalkyl groups, alkoxy groups, aryloxy groups, amido groups, ester groups, imido groups, and the like. Any of the foregoing hydrocarbyl groups may also contain hetero atoms, such as oxygen or nitrogen atoms. Particularly suitable hydrocarbyl groups may be linear or branched alkyl groups. Some representative examples of amine reactants which can be reacted to yield compounds of this disclosure include, but are not limited to, trimethyl amine, triethyl amine, tri-n-propyl amine, dimethylethyl amine, dimethyl lauryl amine, dimethyl oleyl amine, dimethyl stearyl amine, dimethyl eicosyl amine, dimethyl octadecyl amine, N-methyl piperidine, N,N'-dimethyl piperazine, N-methyl-N-ethyl piperazine, N-methyl morpholine, N-ethyl morpholine, N-hydroxyethyl morpholine, pyridine, triethanol amine, triisopropanol amine, methyl diethanol amine, dimethyl ethanol amine, lauryl diisopropanol amine, stearyl diethanol amine, dioleyl ethanol amine, dimethyl isobutanol amine, methyl diisooctanol amine, dimethyl propenyl amine, dimethyl butenyl amine, dimethyl octenyl amine, ethyl didodecenyl amine, dibutyl eicosenyl amine, triethylene diamine, hexa-methylenetetramine, N,N,N',N'-tetramethylethylenediamine, N,N,N',N'-tetramethyl-propylenediamine, N,N,N',N'-tetraethyl-1,3-propanediamine, methyldi-cyclohexyl amine, 2,6-dimethylpyridine, dimethylcylohexylamine, C10-C30-alkyl or alkenyl-substituted amidopropyldimethylamine, C12-C200-alkyl or alkenyl-substituted succinic-carbonyl-dimethylamine, and the like. A suitable first cleaning additive may be the internal salts of oleyl amidopropyl dimethylamino or oleyl dimethyl amine.

If the amine contains solely primary or secondary amino groups, it may be necessary to alkylate at least one of the primary or secondary amino groups to a tertiary amino group prior to the reaction with the halogen substituted C2-C8 carboxylic acid, ester, amide, or salt thereof. In one embodiment, alkylation of primary amines and secondary amines or mixtures with tertiary amines may be exhaustively or partially alkylated to a tertiary amine. It may also be necessary to properly account for the hydrogens on the nitrogen and provide base or acid as required (e.g., alkylation up to the tertiary amine requires removal (neutralization) of the hydrogen (proton) from the product of the alkylation). If alkylating agents, such as, alkyl halides or dialkyl sulfates are used, the product of alkylation of a primary or secondary amine is a protonated salt and needs a source of base to free the amine for further reaction.

The halogen substituted C2-C8 carboxylic acid, ester, amide, or salt thereof for use in making the first cleaning additive may be derived from a mono-, di-, or tri-chloro-bromo-, fluoro-, or iodo-carboxylic acid, ester, amide, or salt thereof selected from the group consisting of halogen-substituted acetic acid, propanoic acid, butanoic acid, iso-propanoic acid, isobutanoic acid, tert-butanoic acid, pentanoic acid, heptanoic acid, octanoic acid, halo-methyl benzoic acid, and isomers, esters, amides, and salts thereof. The salts of the carboxylic acids may include the alkali or alkaline earth metal salts, or ammonium salts including, but not limited to the Na, Li, K, Ca, Mg, triethyl ammonium and triethanol ammonium salts of the halogen-substituted carboxylic acids. A particularly suitable halogen substituted carboxylic acid, or salt thereof may be selected from chloroacetic acid and sodium or potassium chloroacetate. The amount of halogen substituted C2-C8 carboxylic acid, ester, amide, or salt thereof relative to the amount of tertiary amine reactant may range from a molar ratio of about 1:0.1 to about 0.1:1.0.

The internal salts made according to the foregoing procedure may include, but are not limited to (1) hydrocarbyl substituted compounds of the formula R"—NMe$_2$CH$_2$COO where R" is from C1 to C30 or a substituted amido group; (2) fatty amide substituted internal salts; and (3) hydrocarbyl substituted imide, amide, or ester internal salts wherein the hydrocarbyl group has 8 to 40 carbon atoms. Particularly suitable internal salts may be selected from the group consisting of polyisobutenyl substituted succinimide, succinic diamide, and succinic diester internal salts; C8-C40 alkenyl substituted succinimide, succinic diamide, and succinic diester internal salts; oleyl amidopropyl dimethylamino internal salts; and oleyl dimethylamino internal salts.

In yet another approach or embodiment, the quaternary ammonium internal salt may be a quaternary ammonium internal salt of Formula VI:

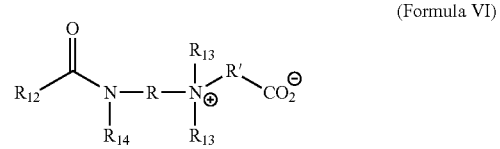

(Formula VI)

wherein R and R' are independently alkylene linkers having 1 to 10 carbon atoms (in other approaches 1 to 3 carbon atoms); $R_{12}$ is independently a hydrocarbyl group or optionally substituted hydrocarbyl group, or an aryl group or optionally substituted aryl group; $R_{13}$ is independently a linear or branched C1 to C4 alkyl group; $R_{14}$ is a hydrogen atom or a C1 to C4 alkyl group. The internal salts of Formula I may also be substantially devoid of free anion species as discussed above. In some embodiments, R and R' are independently alkylene linkers having 1 to 10 carbon atoms; $R_{14}$ is a hydrocarbyl group or optionally substituted hydrocarbyl group, or an aryl group or optionally substituted aryl group; $R_{13}$ is independently a linear or branched C1 to C4 alkyl group; and $R_{14}$ is hydrogen or a C1 to C4 alkyl group. In other embodiments, R and R' are independently alkylene linkers having 1 to 3 carbon atoms and $R_{12}$ is a C8 to C20 hydrocarbyl group.

In another approach, the quaternary ammonium internal salt may include the compound of Formula VI above wherein R is a propylene linker, R' is a methylene linker, $R_{12}$ is a C8 to C20 hydrocarbyl group, and $R_{13}$ is a methyl group. In some embodiments, $R_{12}$ is derived from an oleyl fatty acid. In yet other approaches, the additive is selected from oleyl amidopropyl dimethylamine internal salts or oleyl dimethylamino internal salts. In some approaches, such additive may be substantially devoid of free anion species.

In some approaches, the diesel fuel herein may include about 1 to about 35 ppmw of this additive (ii), and in other approaches, about 5 to about 25 ppmw, and in yet other approaches, about 5 to about 20 ppmw. In yet other approaches, the diesel fuel may include an amount of this additive ranging from at least about 1 ppmw, at least about 5 ppmw, or at least about 10 ppmw to less than about 30 ppmw, less than about 25 ppmw, less than about 20 ppmw, less than about 15 ppmw, or less than about 10 ppmw.

In yet further approaches, a diesel fuel additive or concentrate may include, on an active basis, about 2 to about 20 weight percent of this compound.

Hydrocarbyl Carbonyl Compound Reacted with Guanidines, Ureas, and Thioureas

Yet possible another additive in the blend to reduce measured DPF regeneration frequency when combusting diesel fuel is the reaction product of a hydrocarbyl carbonyl compound and an amine selected from guanidine, urea, thiourea, and combinations thereof. The hydrocarbyl carbonyl reactant compound of the present application can be any suitable compound having a hydrocarbyl moiety and a carbonyl moiety, and that is capable of bonding with the amine compound to form the additive compounds of the present application. Non-limiting examples of suitable hydrocarbyl carbonyl compounds include, but are not limited to, hydrocarbyl substituted succinic anhydrides, hydrocarbyl substituted succinic acids, and esters of hydrocarbyl substituted succinic acids.

As used herein and throughout this application, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, and sulfoxy); (3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

In some aspects, the hydrocarbyl carbonyl compound can be a polyalkylene succinic anhydride reactant having the following Formula VII:

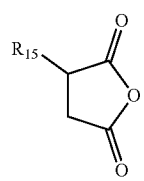

(Formula VII)

where $R_{15}$ is a hydrocarbyl moiety, such as for example, a polyolefin radical having a number average molecular weight of from about 100 to about 10,000 daltons. For example, the number average molecular weight of $R_{15}$ can range from about 1000 to about 5000 daltons, such as about 1200 to about 3000, as measured by GPC. Unless indicated otherwise, molecular weights in the present specification are number average molecular weights.

In some aspects, $R_{15}$ can be a polyolefin radical comprising one or more polymer units chosen from linear or branched alkenyl units. In some aspects, the alkenyl units can have from about 2 to about 10 carbon atoms. For example, the polyolefin radical can comprise one or more linear or branched polymer units chosen from ethylene radicals, propylene radicals, butylene radicals, pentene radicals, hexene radicals, octene radicals and decene radicals. In some aspects, $R_{15}$ can be a polyolefin radical in the form of, for example, a homopolymer, copolymer or terpolymer. In an aspect of the present disclosure, the $R_{15}$ group can be a polyisobutylene radical. The polyolefin compounds used to form the $R_{15}$ polyolefin radicals can be formed by any suitable methods, such as by conventional catalytic oligomerization of alkenes.

In an additional aspect, the hydrocarbyl moiety $R_{15}$ can be derived from a linear alpha olefin or an acid-isomerized alpha olefin made by the oligomerization of ethylene by methods well known in the art. These hydrocarbyl moieties can range from about 8 carbon atoms to over 40 carbon atoms. For example, alkenyl moieties of this type can be derived from a linear $C_{18}$ or a mixture of $C_{20-24}$ alpha olefins or from acid-isomerized $C_{16}$ alpha olefins.

In some aspects, high reactivity polyisobutenes having relatively high proportions of polymer molecules with a terminal vinylidene group can be used to form the $R_{15}$ group. In one example, at least about 60%, such as about 70% to about 90%, of the polyisobutenes comprise terminal olefinic double bonds. There is a general trend in the industry to convert to high reactivity polyisobutenes, and well known high reactivity polyisobutenes are disclosed, for example, in U.S. Pat. No. 4,152,499, the disclosure of which is herein incorporated by reference in its entirety.

Specific examples of hydrocarbyl carbonyl compounds include such compounds as dodecenylsuccinic anhydrides, $C_{16-18}$ alkenyl succinic anhydride, and polyisobutenyl succinic anhydride (PIBSA). In some embodiments, the PIBSA may have a polyisobutylene portion with a vinylidene content ranging from about 4% to greater than about 90%. In some embodiments, the ratio of the number of carbonyl groups to the number of hydrocarbyl moieties in the hydrocarbyl carbonyl compound can range from about 1:1 to about 6:1.

The hydrocarbyl carbonyl compounds can be made using any suitable method. Methods for forming hydrocarbyl carbonyl compounds are well known in the art. One example of a known method for forming a hydrocarbyl carbonyl compound comprises blending a polyolefin and maleic anhydride. The polyolefin and maleic anhydride reactants are heated to temperatures of, for example, about 150° C. to about 250° C., optionally, with the use of a catalyst, such as chlorine or peroxide.

Suitable amine compounds can be chosen from guanidines, ureas and thioureas with a $C_5$ to $C_{60}$ aliphatic carboxylic acid. For example, the amine can be a compound of the Formula VIII, or salts thereof:

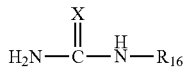

(Formula VIII)

where X is $NR_{17}$, O or S, wherein $R_{17}$ is H or $C_1$ to $C_{15}$ hydrocarbyl; and $R_{16}$ is H, —$NR_{18}R_{19}$ or $C_1$ to $C_{20}$ hydrocarbyl or hydroxyl-substituted hydrocarbyl, wherein $R_{18}$ and $R_{19}$ can be the same or different and are H or $C_1$ to $C_{20}$ hydrocarbyl or hydroxyl-substituted hydrocarbyl.

In an embodiment of the present application, the amine can be chosen from the inorganic salts of guanidines, such as the halide, carbonate, nitrate, phosphate, and orthophosphate salts of guanidines. The term "guanidines" refers to guanidine and guanidine derivatives, such as aminoguanidine. In one approach, the guanidine suitable for the preparation of the additive compound is aminoguanidine bicarbonate. Guanidines, ureas, and thioureas used in the present application, including aminoguanidine bicarbonate, are readily obtainable from commercial sources, or can be prepared in a well-known manner.

The hydrocarbyl carbonyl and amine compounds described above can be mixed together under suitable conditions to provide the desired product compounds of the present disclosure. In one aspect of the present disclosure, the reactant compounds can be mixed together in a mole ratio of hydrocarbyl carbonyl to amine ranging from about 1:1.5 to about 1:2.5. For example, the mole ratio can range from about 1:1.8 to about 1:2.2, such as about 1:2.

Suitable reaction temperatures can range from about 155° C. to about 200° C. at atmospheric pressure. For example, reaction temperatures can range from about 160° C. to about 190° C. Any suitable reaction pressures can be employed, such as, including subatmospheric pressures or superatmospheric pressures. However, the range of temperatures can be different from those listed where the reaction is carried out at other than atmospheric pressure. The reaction can be carried out for a period of time within the range of about 1 hour to about 8 hours, preferably, within the range of about 2 hours to about 6 hours.

It is believed that the resulting reaction product is an aminotriazole. For example, the reaction product can be a bistriazole. The five-membered ring of the triazoles is considered to be aromatic. The aminotriazoles are fairly stable to oxidizing agents and are extremely resistant to hydrolysis.

In one exemplary embodiment, the hydrocarbyl carbonyl is a polyisobutenyl succinic anhydride and the amine is aminoguanidine bicarbonate. These compounds can be reacted together at a ratio of about 1 mole of polyisobutenyl succinic anhydride to 2 moles aminoguanidine bicarbonate at a temperature of about 160° C. It is believed, although it is not certain, that the reaction product is polybutenyl bis-3-amino-1,2,4-triazole. Such a product contains a relatively high nitrogen content, within the range of about 1.8 wt % to about 2.9 wt % nitrogen.

In some approaches, the diesel fuel herein may include, on an active basis, about 5 to about 50 ppmw of this additive (iii), and in other approaches, about 5 to about 30 ppmw, and in yet other approaches, about 10 to about 10 ppmw. In yet other approaches, the diesel fuel may include an amount of this additive, on an active basis ranging from at least about 5 ppmw, at least about 10 ppmw, or at least about 20 ppmw to less than about 30 ppmw, less than about 25 ppmw, less than about 20 ppmw, less than about 15 ppmw, or less than about 10 ppmw.

In yet further approaches, a diesel fuel additive or concentrate may include about 1 to about 15 weight percent of this compound.

Diesel Fuels

The fuels of the present application may be applicable to the operation of diesel engines. The fuels may include any and all middle distillate fuels, diesel fuels, biorenewable fuels, biodiesel fuel, fatty acid alkyl ester, and/or gas-to-liquid (GTL) fuels. "Biorenewable fuels" as used herein is understood to mean any fuel which is derived from resources other than petroleum. Such resources include, but are not limited to, corn, maize, soybeans and other crops; grasses, such as switchgrass, miscanthus, and hybrid grasses; algae, seaweed, vegetable oils; natural fats; and mixtures thereof. In an aspect, the biorenewable fuel can comprise monohydroxy alcohols, such as those comprising from 1 to about 5 carbon atoms. Non-limiting examples of suitable monohydroxy alcohols include methanol, ethanol, propanol, n-butanol, isobutanol, t-butyl alcohol, amyl alcohol, isoamyl alcohol, and mixtures thereof. Preferred fuels include gasoline fuels.

In some approaches, the diesel fuel herein includes less than about 20 weight percent of bio-generated diesel fuel selected from the groups renewable diesel, also known as highly paraffinic fuel, and fatty acid methyl esters and combinations thereof. In other approaches, the fuels include less than 15 weight percent, less than 10 weight percent, less than 5 weight percent, or less than 1 weight percent of biodiesel. In yet other approaches, the diesel fuel includes substantially no bio-generated diesel fuel, which is less than about 1 weight percent, less than about 0.5 weight percent, or none. Renewable diesel includes but is not limited to hydrotreated vegetable oil, gas-to-liquid fuel, biomass-to-liquid fuel and other highly paraffinic fuels. Fatty acid methyl esters include but are not limited to used cooking oil methyl esters, soybean methyl esters, palm methyl esters, rapeseed methyl ester and those manufactured from other vegetable oils. The diesel fuels herein are also low sulfur or ultra-low sulfur diesel fuels. As understood by those of skill, low sulfur fuels have less than 50 ppmw of sulfur, and ultra-low sulfur fuels have less than about 15 ppmw of sulfur.

The fuels herein are suitable for use in various internal combustion systems or engines. The systems or engines may include both stationary engines (e.g., engines used in electrical power generation installations, in pumping stations, etc.) and ambulatory engines (e.g., engines used as prime movers in automobiles, trucks, road-grading equipment, military vehicles, etc.). By combustion system or engine herein is meant, internal combustion engines, for example and not by limitation, Atkinson cycle engines, rotary engines, spray guided, wall guided, and the combined wall/spray guided direct injection engines. Also included are conventional and advanced port-fueled internal combustion engines, with and without advanced exhaust after-treatment systems capability, with and without turbochargers, with and without superchargers, with and without combined supercharger/turbocharger, with and without on-board capability to deliver additive for combustion and emissions improvements, and with and without variable valve timing. Further included are diesel HCCI engines, two-stroke engines, diesel fuel engines, stationary generators, diesel HCCI, supercharged, turbocharged, diesel direct injection engines, engines capably of variable valve timing, leanburn engines, engines capable of inactivating cylinders or any other internal combustion engine. Still further examples of combustion systems include any of the above-listed systems combined in a hybrid vehicle with an electric motor.

Other Additives

One or more optional compounds may be present in the additive and/or fuel compositions of the disclosed embodiments. For example, the additives and/or fuels may contain conventional quantities of cetane improvers, octane improvers, corrosion inhibitors, cold flow improvers (CFPP additive), pour point depressants, solvents, demulsifiers, lubricity additives, friction modifiers, amine stabilizers, combustion improvers, detergents, dispersants, antioxidants, heat stabilizers, conductivity improvers, metal deactivators, marker dyes, organic nitrate ignition accelerators, cycloaromatic manganese tricarbonyl compounds, carrier fluids, and the like. In some aspects, the compositions described herein may contain about 10 weight percent or less, or in other aspects, about 5 weight percent or less, based on the total weight of the additive concentrate, of one or more of the above additives. Similarly, the fuels may contain suitable amounts of conventional fuel blending components such as methanol, ethanol, dialkyl ethers, 2-ethylhexanol, and the like. In some approaches, however, the diesel fuel herein is substantially free of any cetane improvers, which is less than 1 weight percent, less than 0.5 weight percent, or none.

In some aspects of the disclosed embodiments, organic nitrate ignition accelerators that include aliphatic or cycloaliphatic nitrates in which the aliphatic or cycloaliphatic group is saturated, and that contain up to about 12 carbons may be used. Examples of organic nitrate ignition accelerators that may be used are methyl nitrate, ethyl nitrate, propyl nitrate, isopropyl nitrate, allyl nitrate, butyl nitrate, isobutyl nitrate, sec-butyl nitrate, tert-butyl nitrate, amyl nitrate, isoamyl nitrate, 2-amyl nitrate, 3-amyl nitrate, hexyl nitrate, heptyl nitrate, 2-heptyl nitrate, octyl nitrate, isooctyl nitrate, 2-ethylhexyl nitrate, nonyl nitrate, decyl nitrate, undecyl nitrate, dodecyl nitrate, cyclopentyl nitrate, cyclohexyl nitrate, methylcyclohexyl nitrate, cyclododecyl nitrate, 2-ethoxyethyl nitrate, 2-(2-ethoxyethoxy)ethyl nitrate, tetrahydrofuranyl nitrate, and the like. Mixtures of such materials may also be used.

Examples of suitable optional metal deactivators useful in the compositions of the present application are disclosed in U.S. Pat. No. 4,482,357, the disclosure of which is herein incorporated by reference in its entirety. Such metal deactivators include, for example, salicylidene-o-aminophenol, disalicylidene ethylenediamine, di salicylidene propylenediamine, and N,N'-disalicylidene-1,2-diaminopropane.

Suitable optional cycloaromatic manganese tricarbonyl compounds which may be employed in the compositions of the present application include, for example, cyclopentadienyl manganese tricarbonyl, methylcyclopentadienyl manganese tricarbonyl, indenyl manganese tricarbonyl, and ethylcyclopentadienyl manganese tricarbonyl. Yet other examples of suitable cycloaromatic manganese tricarbonyl compounds are disclosed in U.S. Pat. Nos. 5,575,823 and 3,015,668, both of which are incorporated by reference in their entirety.

Other commercially available detergents and/or additives may be used in combination with the reaction products described herein. Such detergents include but are not limited to succinimides, Mannich base detergents, quaternary ammonium compounds, bis-aminotriazole detergents as generally described in U.S. patent application Ser. No. 13/450,638, and a reaction product of a hydrocarbyl substituted dicarboxylic acid, or anhydride and an aminoguanidine, wherein the reaction product has less than one equivalent of amino triazole group per molecule as generally described in U.S. patent application Ser. Nos. 13/240,233 and 13/454,697.

The additives of the present application, including the combination of additives as described above, and any optional additives used in formulating the fuels of this disclosure may be blended into a base fuel individually or in various sub-combinations. In some embodiments, the additive components of the present application may be blended into the fuel concurrently using an additive concentrate, as this takes advantage of the mutual compatibility and convenience afforded by the combination of ingredients when in the form of an additive concentrate. Also, use of a concentrate or as discussed herein, a diesel fuel additive, may reduce blending time and lessen the possibility of blending errors.

Methods of DPF Regeneration and Measuring Frequency Thereof

The methods herein include the combustion of the diesel fuel and the selected additives together with, in some approaches, an excess injection of diesel fuel to provide the regeneration of the DPF and also the measurement of the DPF regeneration frequency. The step of regenerating the diesel particulate filter while combusting the diesel fuel (and optional excess diesel fuel) may be controlled and measured using a variety of techniques. For example and in some embodiments, a thermocouple may be used to measure an exhaust temperature. In one approach, an exhaust gas temperature of about 480° to about 482° C. (900° F.) may be used as a separation point to differentiate between normal operation and regeneration. That is, one regeneration cycle starts when the exhaust gas temperature is about 480° to about 482° C. (900° F.) or above and ends when the exhaust gas temperature drops below about 480° to about 482° C. (900° F.). In some embodiments, the regeneration temperatures may be briefly interrupted by idle periods where the vehicle is not able to maintain the exhaust temperature required for the exothermic reaction in a catalyst (DOC) and consequently the diesel particulate filter. The engine may pause the regeneration during such idle or low revving periods and then re-start the regeneration cycle when the exhaust temperature can be elevated again higher revving. In such instances that the pause is less than about 20 minutes (less than about 15 minutes, less than about 10 minutes, less than about 5 minutes, less than about 2 minutes, or less than about 1 minute), such pause would not entail multiple regeneration cycles and would be considered herein as one regeneration cycle.

As discussed previously, passive regeneration occurs when the engine typically is under high RPM or high load conditions such that injection of excess diesel fuel into a cylinder can react with the catalyst (DOC) causing a temperature rise across the catalyst and subsequently into the diesel particulate filter. This elevated temperature oxidizes and/or burns the soot and other debris trapped in the ceramic and/or diesel particulate filter and regenerates/cleans the diesel particulate filter. In other approaches, active regeneration may occur whereby the vehicle ECU also adjust engine parameters in addition to the excess fuel injection in order to achieve the desired temperatures. As noted above, one regeneration cycle is measured to begin when the exhaust stream exceeds about 480° to about 482° C. (900° F.) and measured to stop when the exhaust stream falls below about 480° to about 482° C., although this threshold temperature is not meant to be limiting. In some embodiments, the regeneration is measured to begin and stop when the exhaust stream exceeds and subsequently falls below about 325° C., about 350° C., about 375° C., about 400° C., about 425° C., about 450° C., about 475° C., about 480° C., about 500° C., or about 600° C. Regeneration temperatures may be between about 300° C. to about 900° C. In some embodiments, the reduction in diesel particulate filter regeneration frequency occurs immediately upon combusting the diesel fuel containing the one or more additives.

As noted above, the regeneration step may refer to an active regeneration and/or a passive regeneration. An active regeneration step is triggered when the exhaust and catalyst temperature is not high enough to light off the diesel oxidation catalyst so the engine control unit (ECU) adjusts engine parameters (injection timing, turbo geometry, etc.) to increase exhaust temperature while injecting excess fuel into the cylinder to cause an exothermic reaction which oxidizes the soot in the diesel particulate filter. A passive regeneration step can be triggered at high RPM/high load conditions where the engine exhaust temperature is already high enough to facilitate the reaction of excess fuel in the diesel oxidation catalyst and the engine control unit only needs to inject excess fuel for the regeneration to occur.

In other embodiments, the regeneration step may be initiated when extra diesel fuel is injected into the engine to raise the temperature of the diesel particulate filter to a temperature above 300° F. For example, in some embodiments, the active regeneration occurs when the exhaust gas stream exceeds 300° C. and the reduction in total average regeneration time occurs immediately upon combusting the diesel fuel during an active regeneration cycle. In some embodiments, the total active regeneration time is measured through the vehicle On-Board Diagnostic (OBD) system by determining the mileage accumulated between a start and stop point that the OBD system identifies active regeneration is occurring. In other approaches, the regeneration occurs when the exhaust gas temperature exceeds the noted predetermined temperature as described previously. In some embodiments, the regeneration occurs via the engine management system increasing the exhaust gas temperature of the engine through injection of the diesel fuel into the exhaust gas stream or injection of the diesel fuel into the engine cylinder on an exhaust stroke of the engine cylinder.

When combusting the low or ultra-low sulfur diesel fuel and select additive blend described in any of the above paragraphs, the measured frequency of regeneration of the diesel filter when combusting diesel fuel including the one or more additives herein is lower than the measured frequency regeneration time per 1000 miles when combusting a diesel fuel in the engine without the one or more additives. In some aspects, the total regeneration frequency per 1000 miles of the diesel particulate filter using the diesel fuel comprising one or more of the hydrocarbyl substituted dicarboxylic anhydride derivative, the quaternary ammonium internal salt, or the reaction product of the hydrocarbyl carbonyl compound and the amine compound may be reduced by about 0.2%, reduced by about 2%, reduced by about 5%, about 10%, reduced by about 15%, reduced by about 20%, reduced by about 25%, reduced by about 30%, reduced by about 35%, reduced by about 40%, reduced by about 45%, reduced by about 50%, reduced by about 55%, or reduced by about 60% relative to the active total regeneration time of the diesel particulate filter when combusting a diesel fuel in the engine without one or more of additives. More particularly, reductions in DPF regeneration frequency may be about 0.5 to about 20 percent.

Definitions

For purposes of this disclosure, the chemical elements are identified in accordance with the Periodic Table of the Elements, CAS version, Handbook of Chemistry and Physics, 75th Ed. Additionally, general principles of organic chemistry are described in "Organic Chemistry", Thomas Sorrell, University Science Books, Sausolito: 1999, and "March's Advanced Organic Chemistry", 5th Ed., Ed.: Smith, M. B. and March, J., John Wiley & Sons, New York: 2001, the entire contents of which are hereby incorporated by reference.

As used herein, the term "active regeneration" is when the exhaust and catalyst temperature is not high enough to light off the diesel oxidation catalyst (DOC) so the engine control unit (ECU) adjusts the engine parameters (e.g., injection timing, turbo geometry, etc.) to increase exhaust temperature while injecting excess fuel into the cylinder to cause an exothermic reaction that oxidizes the soot in the diesel particulate filter and cleans or "regenerates" it.

As used herein, the term "passive regeneration" is when the engine exhaust temperature is already high enough to facilitate the reaction of excess fuel in the diesel oxidation catalyst and the ECU only needs to inject excess fuel for the regeneration to occur typically occurring at high RPM/high load conditions.

As used herein, the term "major amount" is understood to mean an amount greater than or equal to 50 wt. %, for example from about 80 to about 98 wt. % relative to the total weight of the composition. Moreover, as used herein, the term "minor amount" is understood to mean an amount less than 50 wt. % relative to the total weight of the composition.

As described herein, compounds may optionally be substituted with one or more substituents, such as are illustrated generally above, or as exemplified by particular classes, subclasses, and species of the disclosure.

As used herein, an "alkyl" group refers to a saturated aliphatic hydrocarbon group containing (unless otherwise noted in this disclosure) 1-12 (e.g., 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted (i.e., optionally substituted) with one or more substituents such as halo, phospho, cycloaliphatic [e.g., cycloalkyl or cycloalkenyl], heterocycloaliphatic [e.g., heterocycloalkyl or hetero cycloalkenyl], aryl, heteroaryl, alkoxy, aroyl, heteroaroyl, acyl [e.g., (aliphatic)carbonyl, (cycloaliphatic)carbonyl, or (heterocycloaliphatic)carbonyl], nitro, cyano, amido [e.g., (cycloalkylalkyl)carbonylamino, arylcarbonylamino, aralkylcarbonylamino, (heterocyclo alkyl)carbonylamino, (heterocycloalkylalkyl) carbonyl amino, heteroarylcarbonylamino, heteroaralkylcarbonylamino alkylaminocarbonyl, cycloalkylaminocarbonyl, heterocyclo alkylaminocarbonyl, arylaminocarbonyl, or heteroarylaminocarbonyl], amino [e.g., aliphaticamino, cycloaliphaticamino, or heterocycloaliphaticamino], sulfonyl [e.g., aliphatic-SO$_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroarylalkoxy, alkoxycarbonyl, alkylcarbonyloxy, or hydroxy. Without limitation, some examples of substituted alkyls include carboxyalkyl (such as HOOC-alkyl, alkoxy carbonylalkyl, and alkylcarbonyloxyalkyl), cyanoalkyl, hydroxyalkyl, alkoxyalkyl, acylalkyl, aralkyl, (alkoxyaryl)alkyl, (sulfonylamino)alkyl (such as (alkyl-SO$_2$-amino)alkyl), aminoalkyl, amidoalkyl, (cycloaliphatic) alkyl, or haloalkyl.

As used herein, an "alkenyl" group refers to an aliphatic carbon group that contains (unless otherwise noted in this disclosure) 2-8 (e.g., 2-12, 2-6, or 2-4) carbon atoms and at least one double bond. Like an alkyl group, an alkenyl group can be straight or branched. Examples of an alkenyl group include, but are not limited to allyl, isoprenyl, 2-butenyl, and 2-hexenyl. An alkenyl group can be optionally substituted with one or more substituents such as halo, phospho, cycloaliphatic [e.g., cycloalkyl or cycloalkenyl], heterocycloaliphatic [e.g., heterocycloalkyl or hetero cycloalkenyl], aryl, heteroaryl, alkoxy, aroyl, heteroaroyl, acyl [e.g., (aliphatic) carbonyl, (cycloaliphatic)carbonyl, or (heterocycloaliphatic) carbonyl], nitro, cyano, amido [e.g., (cycloalkylalkyl)carbonylamino, arylcarbonylamino, aralkylcarbonylamino, (hetero cycloalkyl) carbonylamino, (heterocyclo alkyl alkyl) carbonyl amino, heteroarylcarbonylamino, heteroaralkylcarbonylamino alkylaminocarbonyl, cycloalkylaminocarbonyl, hetero cyclo alkylaminocarbonyl, aryl aminocarbonyl, or heteroarylaminocarbonyl], amino [e.g., aliphaticamino, cycloaliphaticamino, heterocyclo aliphaticamino, or aliphaticsulfonylamino], sulfonyl [e.g., alkyl-SO$_2$—, cycloaliphatic-SO$_2$—, or aryl-SO$_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroaralkoxy, alkoxycarbonyl, alkylcarbonyloxy, or hydroxy. Without limitation, some examples of substituted alkenyls include cyanoalkenyl, alkoxyalkenyl, acylalkenyl, hydroxyalkenyl, aralkenyl, (alkoxyaryl)alkenyl, (sulfonylamino)alkenyl (such as (alkyl-SO$_2$-amino)alkenyl), aminoalkenyl, amidoalkenyl, (cycloaliphatic)alkenyl, or haloalkenyl.

Unless used otherwise, a hydrocarbyl group refers to a group that has a carbon atom directly attached to a remainder of the molecule and each hydrocarbyl group is independently selected from hydrocarbon substituents, and substituted hydrocarbon substituents may contain one or more of halo groups, hydroxyl groups, alkoxy groups, mercapto groups, nitro groups, nitroso groups, amino groups, sulfoxy groups, pyridyl groups, furyl groups, thienyl groups, imidazolyl groups, sulfur, oxygen and nitrogen, and wherein no more than two non-hydrocarbon substituents are present for every ten carbon atoms in the hydrocarbyl group.

As used herein, fuel-soluble generally means that the substance should be sufficiently soluble (or dissolve) at about 20° C. in the base fuel at least at the minimum concentration required for the substance to serve its intended function. Preferably, the substance will have a substantially greater solubility in the base fuel. However, the substance need not dissolve in the base fuel in all proportions.

The number average molecular weight (Mn) for any approach, aspect, embodiment or Example herein may be determined with a gel permeation chromatography (GPC) instrument obtained from Waters or the like instrument and data as processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5µ, and pore size ranging from 100-10000 Å) with the column temperature at about 40° C. Unstabilized HPLC grade tetrahydrofuran (THF) may be used as solvent, at a flow rate of 1.0 mL/min. The GPC instrument may be calibrated with commercially available polystyrene (PS) standards having a narrow molecular weight distribution ranging from 500-380,000 g/mol. The calibration curve can be extrapolated for samples having a mass less than 500 g/mol. Samples and PS standards can be in dissolved in THF and prepared at concentration of 0.1-0.5 wt. % and used without filtration. GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise or apparent from the context of discussion, all percentages, ratios, and parts noted in this disclosure are by weight.

EXAMPLES

Experiments were performed to evaluate a measured regeneration time and/or measured regeneration frequency of a diesel particulate filter using different additive compositions including one or more additives:
  (i-1) a reaction product of a polyisobutylene (Mn 1000) substituted succinic anhydride (PIBSA) and tetraethylenepentaamine;
  (i-2) another reaction product of a polyisobutylene (Mn 1000) substituted succinic anhydride (PIBSA) and tetraethylenepentaamine;
  (ii) quaternary ammonium salt; and/or
  (iii) a reaction production of polyisobutylene (Mn 1000) succinic acid and aminoguanidine bicarbonate.

Example 1

A first exemplary diesel fuel additive was prepared by blending about 10 to about 50 weight percent of additives (i-1) and (iii) combined in a diesel additive package also including demulsifiers, lubricity agents, and solvents. A pre-blend of (i-1) and (iii) was about 20 to about 50 weight percent of (i-1) and about 2 to about 25 weight percent of (iii) with the remainder being solvent.

Example 2

A second exemplary diesel fuel additive was prepared by blending about 10 to about 50 weight percent (i-1) and (iii) combined in a diesel additive package also including demulsifiers and solvents. The pre-blend of (i-1) and (iii) in the additive was as described in Example 1.

Example 3

A third exemplary diesel fuel additive was prepared by blending about 10 to about 50 weight percent of additives (i-2) and (ii) combined in a diesel additive package also including demulsifiers, copper passivators, antifoam agents, and solvents. The combination of (i-1) and (ii) in the additive was about 2 to about 20 weight percent of (i-2) and about 10 to about 30 weight percent of (ii). This diesel additive package included 2 to about 13 weight percent of a tolyltriazole copper passivator.

Example 4

A fourth exemplary diesel fuel additive was prepared by blending about 10 to about 50 weight percent of additives (i-2) and (ii) combined in a diesel additive package also including demulsifiers, copper passivators, antifoam agents, and solvents. The combination of (i-1) and (ii) in the additive was about 8 to about 35 weight percent of (i-2) and about 1 to about 14 weight percent of (ii). This diesel additive package included 0.5 to about 10 weight percent of a tolyltriazole copper passivoator.

Example 5

Turning to FIG. 1, about 300 to about 500 ppmw of the diesel fuel additive of Example 4 was added to ultra-low sulfur diesel fuel (Colonial ultra-low sulfur having less than 15 ppm sulfur) and combusted in a 2016 Chevrolet Colorado diesel (2.8 L I4 Turbo, high pressure common rail engine). Vehicle preparation include sonically cleaning the injectors, changing the oil, and one DPF forced regeneration before each test started. The test consisted of a dirty-up phase combusting the ultra-low diesel fuel without any additive of Example 4 and then a DPF reduction phase combusting the ultra-low diesel fuel including the additive of Example 4. Results are shown in FIG. 1 illustrating the regeneration frequency of each regeneration cycle during the appropriate phase. By measuring the amount of time spent at the initiation of the regeneration cycle, the total time of the active regeneration step can be estimated. Time spend for regeneration was determined as discussed above and when the exhaust temperature increased above about 480 to about 480° C. As illustrated in FIG. 1, the DPF regeneration phase using the diesel fuel containing the additive of Example 4 provides an immediate reduction in regeneration frequency for the diesel particulate filter as clearly shown by the downward trend as compared to the upward trend of the frequency using the unadditized or base fuel. In this Example, regeneration numbers 1 to 42 were baseline and did not include any DPF reduction additives, and regeneration numbers 47 to the end were fuel including the DPF reduction additives herein. Regeneration frequency is the number of regenerations per 1000 miles and is determined by first calculating the number of miles between regeneration cycles, and then dividing 1000 miles by the mileage between cycles (for instance, if 500 miles passed between regenerations, then the regeneration frequency would be 1000/500 or 2 regenerations per 1000 miles.)

Example 6

Further tests comparing the dirty-up phase with no-additive to a DPF reduction phase using the additive of Example 1, Example 2, or Example 4 at various treat rates. It is expected that the Dirty Up diesel fuel compositions will demonstrate increased regeneration frequency as compared to diesel fuels containing the one or more of the additives provided in Examples 1, 2, and 4 which are expected to demonstrate less frequent regeneration and better fuel efficiency similar to the results of Example 5.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of reducing measured regeneration frequency of a diesel particulate filter in a vehicle combusting diesel fuel, the method comprising:
   (a) combusting a diesel fuel in a vehicle engine, wherein the vehicle includes a diesel particulate filter associated with the engine and wherein the diesel particulate filter requires regeneration thereof, the diesel fuel having less than about 50 ppm of sulfur and a diesel fuel additive including
      (i) a hydrocarbyl substituted dicarboxylic anhydride derivative prepared by reacting a hydrocarbyl-substituted succinic acylating agent with an amine, polyamine, or alkyl amine having one or more primary, secondary, or tertiary amino groups;
      (ii) a quaternary ammonium internal salt obtained from amines or polyamines that is substantially devoid of any free anion species comprising a compound of formula (VI):

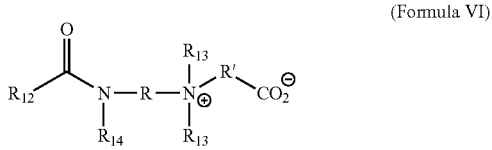

(Formula VI)

wherein
      R and R' are independently alkylene linkers having 1 to 10 carbon atoms;
      $R_{12}$ is a hydrocarbyl group or optionally substituted hydrocarbyl group, or an aryl group or optionally substituted aryl group;
      $R_{13}$ is independently a linear or branched C1 to C4 alkyl group; and
      $R_{14}$ is a hydrogen or a C1 to C4 alkyl group; and
      (iii) a thiazole, triazole, thiadiazole, a tolytriazole, or combinations thereof;
   (b) regenerating the diesel particulate filter while combusting the diesel fuel; and
   (c) comparing the frequency of regeneration of the diesel particulate filter when combusting the diesel fuel comprising the additives with the frequency of regeneration of the diesel particulate filter when combusting a diesel fuel which is devoid of the additives; wherein the frequency of regenerations per 1000 miles of the diesel particulate filter when combusting the diesel fuel comprising the additives is lower than a frequency of regenerations per 1000 miles of the diesel particulate filter when combusting a diesel fuel in the engine devoid of the additives.

2. The method of claim 1, wherein the hydrocarbyl substituted dicarboxylic anhydride derivative of additive (i) has a structure of Formula II

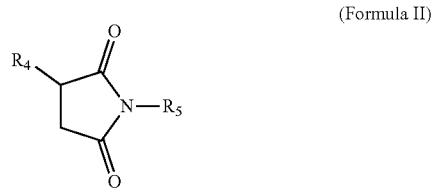

(Formula II)

wherein $R_4$ is a hydrocarbyl group and $R_5$ is hydrogen, an alkyl group, an aryl group, —OH, —$NHR_{5'}$, or a polyamine and wherein R5' is a hydrogen or an alkyl group.

3. The method of claim 2, wherein the additive of Formula II includes a hydrocarbyl substituted succinimide derived from ethylene diamine, diethyelene triamine, triethylene tetraamine, tetraethylene pentamine, pentaethylene hexamine, N,N'-(iminodi-2,1,ethanediyl)bis-1,3-propanediamine and combinations thereof.

4. The method of claim 2, wherein $R_4$ in the compound of Formula II is a hydrocarbyl group having a number average molecular weight from about 450 to about 3,000 and $R_5$ is derived from tetraethylene pentamine and derivatives thereof.

5. The method of claim 1, wherein R and R' are independently alkylene linkers having 1 to 3 carbon atoms and $R_{12}$ is a C8 to C20 hydrocarbyl group.

6. The method of claim 1, Wherein R' includes a methylene linker.

7. The method of claim 1, wherein $R_{13}$ is a methyl group.

8. The method of claim 1, wherein $R_{12}$ is derived from an oleyl fatty acid.

9. The method of claim 1, wherein the diesel fuel includes about 5 ppmw to about 150 ppmw of additive (i) and about 1 ppmw to about 35 ppmw of additive (ii).

10. The method of any of claim 1, wherein the diesel fuel includes less than about 20 weight percent of bio-generated diesel fuel additives selected from the group consisting of fatty acid methyl esters, hydrotreated vegetable oil, soybean methyl esters, palm methyl esters, and combinations thereof.

11. The method of any of claim 1, wherein the regeneration occurs when the engine injects excess diesel fuel into a cylinder to increase the exhaust gas temperature to exceed a predetermined temperature and reacts with a catalyst (DOC) causing an elevated temperature across the catalyst and into the diesel particulate filter.

12. The method of claim 11, wherein the regeneration is measured when the exhaust gas stream exceeds about 480° C.

13. The method of claim 1, wherein the reduction in regeneration frequency occurs immediately upon combusting the diesel fuel having the one or more additives.

14. The method of claim 1, wherein the regeneration frequency per 1000 miles is about 0.5 to about 20 percent lower than the regeneration frequency per 1000 miles of a diesel fuel devoid of the one or more additives.

* * * * *